United States Patent Office 3,265,505
Patented August 9, 1966

3,265,505
PHOTOGRAPHIC PRODUCTS
Joseph S. Yudelson, Rochester, N.Y., assignor to Eastman Kodak Company, Rochester, N.Y., a corporation of New Jersey
Filed Apr. 2, 1962, Ser. No. 184,387
15 Claims. (Cl. 96—76)

This invention relates to the photographic art. This invention has particular reference to photographic products comprised of at least one layer of a hydrophilic polymeric material, at least one surface of which has been treated with a specific and critical amount of a water-soluble complex compound of the Werner-type in which a trivalent nuclear chromium atom or a trivalent nuclear aluminum atom is coordinated with a carboxylic acido group having at least 10 carbon atoms whereby there is provided thereon a barrier layer that is selectively absorbent.

An object of this invention is to provide photographic products comprised of at least one layer of a hydrophilic polymeric material, at least one surface of which has been treated or coated with a specific and critical amount of a water-soluble complex compound of the Werner-type in which a trivalent nuclear aluminum atom is coordinated with a carboxylic acido group having at least 10 carbon atoms to provide thereon a surface layer or a barrier layer that is selectively absorbent.

Other objects of this invention will, in part, be obvious and will, in part, appear hereinafter.

Figure 1:
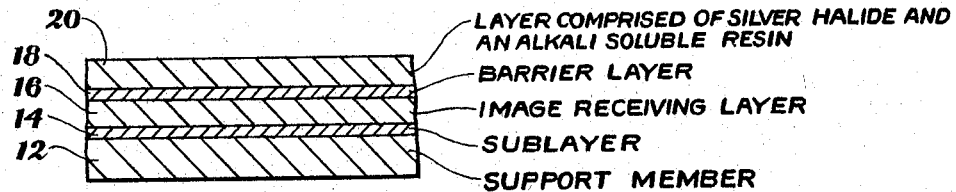
Figure 2:
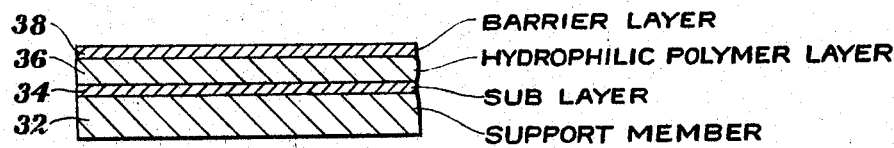

For a complete understanding of the nature and the objects of this invention, reference is made to the following detailed description and drawing, in which:

FIG. 1 is a view in cross-section of a photographic product prepared in accordance with this invention, and FIG. 2 is a cross-sectional view of another photographic product prepared in accordance with this invention.

In the description of this invention, certain terms pertaining to the behavior of polymeric materials employed in the photographic art with respect to water will be employed. These terms are used in their accepted and ordinary meaning; however, this invention will be understood more clearly by a fuller understanding of the terms. Thus, by "soluble" is meant the property of mixing with a liquid to form a homogeneous mixture, while "insoluble" means the lack of such property. "Hydrophilic" refers to the ability of a polymeric material to absorb or adsorb water, and conversely, "hydrophobic" refers to the lack of such ability. Thus, a polymeric material can be insoluble in water but nevertheless hydrophilic, that is, it might not dissolve in water to make a homogeneous mixture, but at the same time it will absorb water, swelling up and becoming slimy or sticky. Hydrophobic polymeric materials, on the other hand, are substantially impervious to the action of water and tend to be water-repellent, that is, to resist wetting by water.

In accordance with this invention, it has been determined that a water-soluble complex compound of the Werner-type in which a trivalent nuclear chromium atom or a trivalent nuclear aluminum atom is coordinated with a carboxylic acido group having at least 10 carbon atoms can be applied to or coated on a surface of a layer of a hydrophilic polymeric material, in specific and critical amounts, to provide thereon a treated surface layer or barrier layer that is selectively absorbent. That is, the treated surface layer will prevent substantially the migration of molecules having a cross-sectional diameter greater than those of certain other molecules that must diffuse through the layer for photographic processing and the like. Thus, the surface characteristics of the layer of hydrophilic polymeric material are modified to provide a treated surface layer thereon whereby certain substances such as water are permitted to pass through the layer while other substantially larger molecules such as molecules of polymeric materials are denied passage therethrough.

While the description and the specific examples of this invention will be directed to certain aspects thereof, it will be apparent to those skilled in the art that the teachings of this invention can be employed for purposes other than those specifically described herein.

Water-soluble complex compounds of the Werner-type in which a trivalent nuclear chromium atom or a trivalent nuclear aluminum atom is coordinated with a carboxylic acido group having at least 10 carbon atoms are well-known chemical compounds and are available commercially, usually as a solution thereof in a solvent such as isopropanol. For the purposes of brevity, these compounds will be referred to hereinafter as Werner-type complexes.

The Werner-type complexes can be represented by the structural formula:

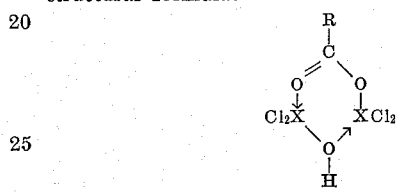

wherein X is selected from the group consisting of aluminum and chromium and R represents the non-carboxy group of the acid.

Examples of specific acids that can be employed in preparing the complex include stearic acid, myristic acid, lauric acid, abietic acid, palmitic acid, and the like.

Werner-type chromium complexes of myristic acid and Werner-type chromium complexes of stearic acid are available commercially as solutions thereof in isopropanol. The commercially available solutions usually contain about 30 percent by weight of the Werner-type complex and about 70 percent by weight of isopropanol. The solution forms of these compounds are available commercially under the proprietary designation Quilon M and Quilon S, respectively.

The Werner-type chromium complex of myristic acid has the formula:

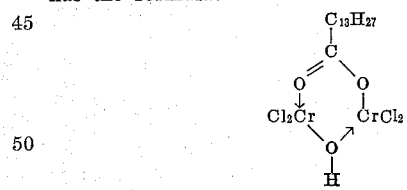

the Werner-type chromium complex of stearic acid has the formula:

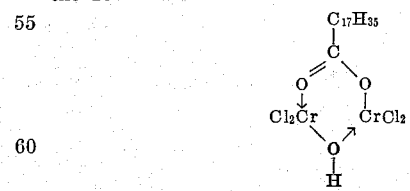

A specific example of a Werner-type aluminum complex is the complex of aluminum and myristic acid and can be represented by the formula:

The Werner-type complexes are applied to a surface of a layer of hydrophilic polymeric material in solution form and in an amount sufficient to provide thereon a coverage of Werner-type complex of from about 2 mg. to 10 mg. per square foot.

The example that follows is illustrative of a satisfactory coating solution for use in applying a Werner-type complex to the surface of the hydrophilic polymeric material.

*Example I*

About 20 grams of water is heated in a vessel to a temperature of about 95° C. and about 2 grams of a solution containing 30 percent by weight of the water-soluble Werner-type chromium complex of myristic acid dissolved in 70 percent by weight of isopropanol is added under the surface of the heated water with constant agitation. Agitation or stirring is continued for about 5 minutes and then 175 grams of water at a temperature of about 25° C. is added thereto. The resulting solution contains about 3 percent by weight based on the total weight of the solution of the Werner-type complex. The 175 grams of water added above contained the surfactant sodium lauryl sulfate in an amount sufficient to give 6 percent surfactant in the solution by weight based on the weight of the Werner-type complex in the solution.

In the above example, the surfactant can be eliminated if desired; however, it is recommended that a surfactant be employed in preparing the coating composition for use in this invention so that the composition will be substantially stable for a prolonged period of time. The selection of suitable surfactants for this invention is well within the skill of those versed in the art. Examples of specific surfactants that can be employed include lauryl alcohol sulfate which is available commercially under the proprietary designation Duponol ME, and isooctyl phenylpolyethoxyethanol, which is available commercially under the proprietary designation Triton X–100.

The amount of Werner-type complex employed in the coating solution can be varied and is within the skill of those versed in the art. It has been determined that coating solutions or compositions comprised of from about 0.1 percent to about 5 percent by weight of the Werner-type complex based on the total weight of the solution are satisfactory.

While the teachings of this invention can be employed in a number of ways in the photographic art, it has been determined that they are particularly useful in a preparation of photographic film products for use in the diffusion transfer process and in the manufacture of processing webs. The diffusion transfer process involves exposing a sensitive silver halide emulsion layer to an object or an image, developing a negative silver image therein, and then dissolving the unexposed silver halide of the emulsion layer and causing the resulting dissolved silver complex to diffuse into a contiguous image-receiving layer where it is reduced or precipitated to form a visible positive image of silver or a silver compound such as silver sulfide. The silver halide emulsion layer is subsequently removed from the film product by washing with warm water. It is important that this layer wash off or be removed completely together with any developed silver that this layer might contain. Otherwise, the photographic properties of the resulting product will not be entirely satisfactory.

Photographic products employed in the diffusion transfer process are usually comprised of a base or support member of photographic paper, usually coated with a hydrophobic resinous material such, for example, as polyethylene, a sublayer comprised of a hydrophilic polymeric material, an image-receiving layer which is usually comprised of a hydrophilic polymeric material and a nucleating agent for silver, and a light-sensitive emulsion layer comprised of a silver halide and an alkali-soluble, water-insoluble polymeric resinous material.

After exposure, the film product is developed in a commercial developing solution containing thiosulfate ions so as to give a negative silver image therein and at the same time, dissolving the unexposed silver halide of the emulsion layer (the non-exposed silver halide being solubilized by the thiosulfate ions of the developing solution) and causing the resulting dissolved silver complex to diffuse into the image-receiving layer where it is deposited as metallic silver on the surface of the nucleating agent. During the developing treatment, the silver halide emulsion layer has become solubilized and is subsequently removed by washing with warm water.

Heretofore, it has been difficult to remove substantially all of this layer from the film product owing to the fact that, during the manufacture of the film product, there results an intermixing of the light-sensitive silver halide emulsion layer and the image-receiving layer over which it is applied. This results in an undesired bonding of the two layers and renders subsequent removal of the silver halide emulsion layer difficult.

In accordance with this invention, it has been determined that, by treating the surface of the image-receiving layer with a Werner-type complex in an amount sufficient to provide a coverage on the image-receiving layer of from about 2 mg. to 10 mg. per square foot, the above-described intermixing and undesired bonding of the subsequently applied light-sensitive emulsion layer is eliminated substantially.

The following example is illustrative of a silver halide emulsion composition that has been found to be particularly satisfactory for use in preparing photographic products for use in the diffusion transfer process. This composition is disclosed in Patent 3,020,155, dated February 6, 1962. Reference to Patent 3,020,155 is hereby made for examples of other suitable compositions of this type.

*Example II*

To 1 liter of a positive-speed, sulfur-sensitized, high-contrast chlorobromide emulsion containing approximately 30 grams of gelatin and 1 mole of silver halide per liter are added the following ingredients: (Such emulsions containing low gelatin content can be prepared by the procedures described in the MacWilliam U.S. patent application Serial No. 440,282, filed June 29, 1954, now U.S. Pat. No. 2,756,148, and the Yutzy and Frame U.S. Patent 2,614,928, dated October 21, 1952.)

30 cc. of a 50 percent aqueous solution of glycerin
20 cc. of a solution containing 34 grams of salicylaldehyde oxime per liter of methanol
30 cc. of a 7.6 percent saponin solution
12½ cc. of a solution containing 0.2 gram of 1-carboxymethyl-5-[(3 - ethyl - 2,3 - benzoxazolylidene)-ethylidene]-3-phenyl-2-thiohydantoin in 30 cc. of methanol plus 1 drop of triethylamine To the above mixture is added 4 liters of a 4 percent solution of the ammonium salt of a cellulose ether phthalate (an ethyl cellulose containing 45.8 percent ethoxyl phthalated to 22.7 percent phthalyl) and 2 grams of 3-methylbenzothiazoline-2-thione dissolved in methanol. The resulting mass is stirred at 30° C., thoroughly dispersed and is ready for application.

The cellulose ether phthalate employed in the above composition is an alkali-soluble, water-insoluble polymeric material which, owing to its alkali solubility, can be, after treatment with commercial developing solutions, washed off in a stream of warm water. A satisfactory cellulose ether phthalate can be made by the esterification of a cellulose ethyl ether containing 42 percent ethoxyl until about 5 perecnt to 10 percent phthalation has taken place. A preferred cellulose ether phthalate is made from a celluolse ethyl ether containing 45 percent ethoxyl, the final ester containing about 24 percent phthalyl. Other suitable carboxylated cellulose derivatives for use as a vehicle in the preparation of the above silver halide emulsion composition are the phthalic, succinic, and maleic acid monoesters of ethyl celluloses and their ammonium, alkali metal and amine salts, the esters being made from cellulose ethyl ethers having an alkoxyl content of at least 42 percent and the esters having a dicarboxylic acid radical content of at least 5 percent and preferably at least 20 percent.

The following example is illustrative of this invention:

Example III

Polyethylene-coated photographic paper is subbed with a layer of an ethylacrylate-acrylic acid copolymer comprised of 75 mole percent of ethylacrylate and 25 mole percent of acrylic acid to provide a layer thereon having a thickness of about 0.1 mil. This sublayer is coated with a composition comprised of, by weight, 7 parts of the ammonium salt of ethylacrylate (75 mole percent)-acrylic acid (25 mole percent) copolymer, 1 part of lime process gelatin, 0.5 part of butane-diol-bis (glycidyl ether), .005 part of finely-divided zinc sulfide, and 92 parts of water at a coverage of about two pounds of composition per 100 sq. ft. of surface. After drying, the resulting composite member is aged for about seven days at room temperature conditions during which time substantially all the ammonia evaporates from the applied coating and the copolymer and gelatin are cross-linked by the butane-diol-bis (glycidyl ether). There is thus provided a polyethylene coated photographic paper subbed with an ethylacrylate-acrylic acid copolymer layer, and an image-receiving layer comprised of cross-linked copoylmer and gelatin and finely divided zinc sulfide which serves as a nucleating agent for silver.

The coating composition of Example II is applied to the surface of the image-receiving layer in an amount sufficient to provide thereon a coverage of 600 square feet per mole of silver halide and dried in a conventional manner. This product is exposed to a line copy image and developed in a developer solution comprised of, by weight, 10 parts of N-monomethyl p-aminophenol sulfate (available commercially under the proprietary designation Elon), one part of hydroquinone, 50 parts of sodium sulfite, 100 parts of sodium carbonate, 20 parts of sodium thiosulfate, and 920 parts water. The exposed emulsion is developed to give a silver image in the emulsion layer and the non-exposed silver halide is solubilized by the thiosulfate in the developer solution and migrates into the image-forming layer where the soluble silver complex deposits silver on the zinc sulfide. The thus-treated film product is placed under a stream of warm water and the emulsion layer washed or removed therefrom. It is essential that this layer wash off completely together with any developed silver that this layer might contain. However, it has been determined that small amounts of the emulsion layer adhere to the image-receiving layer even under vigorous washing conditions.

Example IV

A film product is prepared in substantially the same manner as that described in Example III above with the exception that prior to the application of the light-sensitive emulsion layer there is applied to the image-receiving layer the coating composition of Example I in an amount sufficient to provide on the image-receiving layer a coverage of the Werner-type complex of about 2 mg. per square foot. This resulting film product is exposed to a line copy image and developed in the manner described in Example III above. During wash-off, the silver halide emulsion layer is substantially all removed therefrom providing a highly satisfactory positive-image film product.

In Examples II and IV above, it is to be noted that a cross-linking agent butane-diol-bis (glycidyl ether) was employed in preparing the image-receiving layer. This cross-linking agent provides a film or layer that is substantially insoluble and hardens the layer. Thus, the layer will not be dissolved or otherwise adversely affected by developing solutions. Examples of other suitable bisepoxide hardening agents that can be employed for this purpose are disclosed in application Serial No. 752,402, filed August 1, 1958, now U.S. Patent No. 3,047,394, reference to which is hereby made. Specific examples of bisepoxide compounds include bis(2,3-epoxypropyl ether), vinyl cyclohexene dioxide, ethylene bisglycidyl ether, bis-(epoxypropoxyethyl) ether, hydroquinone bisglycidyl ether, resorcinol bisglcidyl ether, resorcinol bisglycidyl ether and diepoxybutane.

Suitable silver precipitating agents that can be employed in the image-receiving layer are well known and include, for example, sulfides, selenides, polysulfides, polyselenides, thiourea, mercaptans, stannous halides, heavy metals and heavy metal salts and fogged silver halide. Heavy metal sulfides such as lead, silver, zinc, antimony, cadmium and bismuth sulfides are useful, particularly the sulfides of lead and zinc alone or in admixture, or complex salts of these with thioacetamide dithiooxamide, or dithio-biuret. The heavy metal can be silver, gold, platinum, palladium, or mercury, preferably in the finely divided or colloidal form. The noble metals are particularly efficacious.

It will thus be apparent from Examples III and IV above that by applying to a surface of the image-receiving layer an amount of a Werner-type complex, as specified, there results substantially no intermixing of the subsequently applied silver halide emulsion layer with the image-receiving layer, and yet the processing solution can pass through the barrier layer and deposit silver metal on the nucleating agent, zinc sulfide. Thus, the amount of Werner-type complex that is employed in treating the surface of the hydrophilic polymeric layer is critical in that its coverage is sufficient to prevent passage therethrough of the larger molecules of the resin of which the silver halide emulsion layer is comprised, and yet will not prevent the smaller molecules of which the processing solution is comprised from passing therethrough and into the image-receiving layer.

As above set forth, the barrier layer of this invention is also highly satisfactory for use in preparing processing webs. Commercially available processing webs are often comprised of a support layer to which there is applied a layer of a hydrophilic polymeric material such, for example, as an ethylacryate-acrylic acid copolymer comprised of from about 50 to 90 mole percent of ethylacrylate and from about 50 to 10 mole percent of acrylic acid. Particularly suitable ethylacrylate-acrylic acid copolymers for this specific use are comprised of about 75 mole percent of ethylacrylate and about 25 mole percent of acrylic acid. The web thus prepared is placed in a developing solution such, for example, as a developing solution disclosed in application Serial No. 835,473, filed August 24, 1959 now U.S. Patent No. 3,179,517. Reference is hereby made to this application for a more detailed description of processing webs and developing solutions that can be employed in their preparation. While such processing webs have proved highly satisfactory in use, they possess one main drawback in that upon standing there is a substantial exudation of polymeric material dissolved in the processing liquid.

The barrier layer of this invention can be employed in preparing processing webs whereby the exudation of the polymeric material is eliminated substantially. However, the barrier layer does not prevent the passage therethrough of the developing solution during the process of treating therewith exposed photographic film products.

The following examples illustrate this aspect of the invention:

Example V

A polyethylene terephthalate film of a thickness of about 2.5 mils, carrying a 0.1 mil thick sublayer of ethylacrylate (75 mole percent)-acrylic acid (25 mole percent) copolymer, is coated with a coating composition comprised of the ammonium salt of ethylacrylate (75 mole percent)-acrylic acid (25 mole percent) copolymer, about 1.5 percent by weight based on the weight of the copolymer of butane-diol-bis (glycidyl ether) and water. The coating composition is applied to the surface of the sublayer in an amount sufficient to provide thereon a coverage of the copolymer of about 2.0 grams per square foot. The thus-prepared member is allowed to age for about 30 days during which time substantially all the ammonia is evaporated from the applied coating and the butane-diol-bis (glycidyl ether) cross-links the polymer to the desired degree. The thus-prepared web is immersed in a silver halide developing solution comprised of

| | Grams |
|---|---|
| 2,2'-iminodiethanol-SO$_2$ (15.0% SO$_2$ by weight) | 200 |
| Hydroquinone | 10 |
| Potassium iodide | 2 |
| Sodium sulfite | 30 |
| Water, enough to make 1 liter. | |

The web is sponged to remove excess developer solution, convolutely wound up, and stored in a glass container. The developer pickup is about 3.80 grams per square foot.

*Example VI*

A second processing web is prepared in substantially the same manner as that described in Example V with the exception that prior to the immersion of the prepared web in the developing solution, there is applied to the ethylacrylate-acrylic acid copolymer layer the coating composition of Example I which is comprised of the Werner-type complex. The coating solution is applied in an amount sufficient to provide on the surface of the ethylacrylate-acrylic acid copolymer layer a coverage of the Werner-type complex of about 10 mg. per square foot. After drying to remove substantially all of the solvent from the coating composition, the thus-prepared member or web is immersed in the developing solution of Example V, sponged and stored in a glass container. The developer pickup in this case is about 3.62 grams per square foot.

After one-day storage at 75° F., the glass jars are opened and the contents thereof examined. The Werner-type complex treated processing web shows substantially no change in appearance whereas the sample of Example V above, which is not treated with the Werner-type complex, indicated that resin had exuded badly taking with it developer solution which was evidenced by a small pool of exuded resin and developer solution in the bottom of the glass jar. Both webs are pressed in face-to-face contact for one minute with samples of Kodak Panatomic Film which had been exposed to a negative. The film samples are then dipped briefly into a fixer bath and washed. Good images are formed in both cases.

Thus, it will be apparent to those skilled in the art that the processing web treated in accordance with the teachings of this invention, as described in Example VI above, has far superior properties to those not treated with the Werner-type complex.

It will further be apparent to those skilled in the art that since good images were formed in both cases above, using the processing web of Example V and the processing web of Example VI, that the treatment with the Werner-type complex in no way affected the ability of the processing solution to perform its intended function.

The following example illustrate how the barrier layer of this invention prevents intermixing of resin layers.

*Example VII*

A coating of the sodium salt of ethylacrylate (75 mole percent)-acrylic acid (25 mole percent) copolymer is applied to the sublayer of a sheet of subbed cellulose acetate sheet. The coating composition is comprised of the above sodium salt dissolved in water and containing about five percent by weight based on the weight of the copolymer of the cross-linking agent butane-diol-bis (glycidyl ether). After drying, the applied coating has a thickness of about 5 mils. The coating solution of Example I is applied to the ethylacrylate-acrylic acid copolymer layer in an amount sufficient to provide thereon a coverage of about 3 mg. per square foot of the Werner-type complex. After this layer is dried, a coating composition consisting of gelatin and water is coated onto the thus-treated surface to provide thereon a layer of gelatin having a dry thickness of about .5 mil. The dry adhesion of the applied gelatin layer to the ethylacrylate-acrylic acid copolymer layer is good by the tape test. In order to prove the absence of penetration of the ethylacrylate-acrylic acid copolymer layer by the gelatin layer, the following procedure is carried out:

The thus-prepared film is placed in water maintained at a temperature of about 75° C. for about 3 minutes and removed therefrom. The gelatin layer peeled off very easily and readily. The remaining coating on the acetate support was dried and then immersed in a mixture of 70 parts by volume of p-dioxane and 30 parts by volume of methanol. This mixture dissolves the cellulose acetate base and leaves remaining the ethylacrylate-acrylic acid copolymer layer. The nitrogen content of this layer is measured by the Kjehldahl method and compared with a film obtained by the same procedure but which had not been treated as above with the Werner-type complex. Since the sodium salt of ethylacrylate-acrylic acid copolymer contains no nitrogen, the presence of gelatin in the layer can be readily detected. The results of the measurement of the nitrogen content by the Kjehldahl method revealed that the layer that had not been treated with the Werner-type complex contained about 17.7 percent by weight of nitrogen while the treated film showed a nitrogen content of less than about 0.1 percent by weight. Thus, it will be apparent that the very thin barrier layer resulting from the treatment of the ethylacrylate-acrylic acid copolymer layer with the Werner-type complex prevented the passage of gelatin molecules into the ethylacrylate-acrylic acid copolymer layer and yet sufficient polar sites were left on the surface for good dry adhesion of the gelatin to be obtained. Furthermore, the barrier layer did not prevent the passage therethrough of water into the treated layer.

It will be obvious to those skilled in the art, after considering the teachings of this invention, that there can be provided on the surface of a layer of a hydrophilic polymeric material a treated surface layer or barrier layer that will cover sufficient number of polar sites to prevent passage therethrough of molecules of substantial size. However, the coverage is not sufficient to cover all polar sites and will leave exposed substantial number of polar sites to permit the passage therethrough of photographic processing solutions, water, and the like.

In the manufacture of photographic film products for use in the diffusion transfer process referred to above, it was pointed out that the light-sensitive emulsion layer is composed of an alkali-soluble, water-insoluble polymeric material and silver halide. Suitable alkali-soluble, water-insouble resins that can be employed for this purpose are well known in the photographic art and include copolymers of alkylmethacrylates and methacrylic acid, the carboxy resinic lactones, the polyvinyl phthalates, the polyvinyl acetate phthalates, and the ethyl cellulose phthalates. Other suitable resins include the cellulose organic acid esters containing dicarboxylic acid groups such as cellulose acetate phthalate, cellulose acetate maleate, cellulose acetate succinate, cellulose acetate propionate phthalate, cellulose acetate propionate maleate, and cellulose acetate propionate succinate. The above resins are more fully described in application Serial No. 132,712, filed August 21, 1961, now U.S. Pat. No. 3,201,251, reference to which is hereby made.

Hydrophilic polymeric materials that can be treated in accordance with the teachings of this invention include the ethylacrylate-acrylic acid copolymers, as set forth in certain of the examples, partially hydrolyzed polyvinyl esters, polyvinyl acetals, partially hydrolyzed cellulose esters, regenerated cellulose, water-soluble polyamides, and the like. Gelatin layers can also be treated in accordance with this invention.

Referring to FIG. 1 of the drawing, there is shown a photographic product 10 for use in a diffusion transfer process. The product is comprised of a support member 12 which carries thereon a sublayer 14 comprised of a hydrophilic polymeric material, an image-receiving layer 16 comprised of a hydrophilic polymeric material and nucleating agent for silver, a barrier layer 18 derived by treating the surface of the layer 16 with a Werner-type complex in accordance with this invention and a light-sensitive layer 20 comprised of an alkali-soluble, water-insoluble resin and silver halide.

In FIG. 2, of the drawing, there is shown a processing web 30 prepared in accordance with this invention. The processing web is comprised of a support member 32 carrying thereon a sublayer 34, a hydrophilic polymer layer 36 imbibed of a photographic developing solution, and a barrier layer 38 prepared in accordance with this invention.

It is to be understood that the description and drawing of this invention are illustrative and not in limitation thereof.

I claim:
1. A composite member comprised of a layer of a hydrophilic polymeric material and a coating on one surface of said layer in an amount of from about 2 milligrams to 10 milligrams per square foot of surface of a Werner-type complex in which a trivalent atom selected from the group consisting of a trivalent chromium atom and a trivalent aluminum atom is coordinated with a carboxylic acid group having at least 10 carbon atoms.

2. A composite member comprised of a layer comprised of an ethylacrylate-acrylic acid copolymer and a coating on one surface of said layer in an amount of from about 2 milligrams to 10 milligrams per square foot of surface of a Werner-type complex in which a trivalent atom selected from the group consisting of a trivalent chromium atom and a trivalent aluminum atom is coordinated with a fatty acid group having at least 10 carbon atoms.

3. A composite member in accordance with claim 2 wherein the Werner-type complex is a chromium complex of myristic acid.

4. A composite member in accordance with claim 2 wherein the Werner-type complex is a chromium complex of stearic acid.

5. A composite member in accordance with claim 2 wherein the Werner-type complex is an aluminum complex of myristic acid.

6. A photographic product for use in a diffusion transfer process comprised of a support member, an image-receiving layer adjacent said support member comprised of a hydrophilic polymeric material and a silver precipitating agent, a light-sensitive layer comprised of an alkali-soluble, water-insoluble polymeric material and silver halide and a barrier layer disposed between the image-receiving layer and the light-sensitive layer, said barrier layer being a coating in an amount of from about 2 milligrams to 10 milligrams per square foot of surface of a Werner-type complex in which a trivalent atom selected from the group consisting of a trivalent chromium atom and a trivalent aluminum atom is coordinated with a fatty acid group having at least 10 carbon atoms.

7. A photographic product for use in the diffusion transfer process comprised of a support member, an image-receiving layer adjacent said support member comprised of an ethylacrylate-acrylic acid copolymer and finely-divided zinc sulfide, a light-sensitive layer comprised of an alkali-soluble, water-insoluble polymeric material and silver halide, and a barrier layer disposed between the image-receiving layer and the light-sensitive layer, said barrier layer being a coating in an amount of from about 2 milligrams to 10 milligrams per square foot of surface of a Werner-type complex in which a trivalent atom selected from the group consisting of a trivalent chromium atom and a trivalent aluminum atom is coordinated with a fatty acid group having at least 10 carbon atoms.

8. A photographic product in accordance with claim 7 wherein the Werner-type complex is a chromium complex of myristic acid.

9. A photographic product in accordance with claim 7 wherein the Werner-type complex is a chromium complex of stearic acid.

10. A photographic product in accordance with claim 7 wherein the Werner-type complex is an aluminum complex of myristic acid.

11. A processing web comprised of a support member, a layer of a hydrophilic polymeric material and a coating on one surface of said layer in an amount of from about 2 milligrams to 10 milligrams per square foot of surface of a Werner-type complex in which a trivalent atom selected from the group consisting of a trivalent chromium atom and a trivalent aluminum atom is coordinated with a fatty acid group having at least 10 carbon atoms, said layer of hydrophilic polymeric material being inbibed of a silver halide developing solution.

12. A processing web comprised of a support member, a layer of an ethylacrylate-acrylic acid copolymer and a coating on one surface of said layer, in an amount of from about 2 milligrams to 10 milligrams per square foot of surface of a Werner-type complex in which a trivalent atom selected from the group consisting of a trivalent chromium atom and a trivalent aluminum atom is coordinated with a fatty acid group having at least 10 carbon atoms, said layer of ethylacrylate-acrylic acid copolymer being imbibed of a silver halide developing solution.

13. A processing web in accordance with claim 12 wherein the Werner-type complex is a chromium complex of myristic acid.

14. A processing web in accordance with claim 12 wherein the Werner-type complex is a chromium complex of stearic acid.

15. A processing web in accordance with claim 12 wherein the Werner-type complex is an aluminum complex of myristic acid.

References Cited by the Examiner

UNITED STATES PATENTS

| | | | |
|---|---|---|---|
| 670,118 | 3/1901 | Thornton | 96—83 |
| 2,273,040 | 2/1942 | Iler | 117—100 |
| 2,447,064 | 8/1948 | Gebhart | 260—414 |
| 2,563,342 | 8/1951 | Land | 96—29 |
| 2,584,030 | 1/1952 | Land | 96—29 |
| 2,764,085 | 9/1956 | Shoemaker | 96—33 |
| 2,925,340 | 2/1960 | Bryce et al. | 96—83 |
| 3,020,155 | 2/1962 | Yackel | 96—29 |
| 3,029,154 | 4/1962 | Kapral | 117—15 |
| 3,062,674 | 11/1962 | Houck et al. | 96—87 |

FOREIGN PATENTS 594,237 12/1960 Belgium.
804,971 11/1958 Great Britain.

OTHER REFERENCES

Tappi, 36, No. 7, pages 107–110 (1953).

NORMAN G. TORCHIN, *Primary Examiner.*

G. H. BJORGE, D. D. PRICE, *Assistant Examiners.*